July 9, 1946.   E. B. ETCHELLS   2,403,645
METHOD OF MAKING BEARINGS
Filed June 7, 1943   2 Sheets-Sheet 1

Inventor
Eugene B. Etchells
By Blackmar, Spencer & Flint
Attorneys

July 9, 1946.  E. B. ETCHELLS  2,403,645
METHOD OF MAKING BEARINGS
Filed June 7, 1943  2 Sheets-Sheet 2

Inventor
Eugene B. Etchells
By Blackmore, Spencer & Hint
Attorneys

Patented July 9, 1946

2,403,645

UNITED STATES PATENT OFFICE 2,403,645

METHOD OF MAKING BEARINGS

Eugene B. Etchells, Detroit, Mich., assignor to General Motors Corporation, Detroit, Mich., a corporation of Delaware Application June 7, 1943, Serial No. 489,892

6 Claims. (Cl. 29—149.5)

This invention has to do with the manufacture of bearings from sheet metal clad with bearing metal, such as copper or silver. For best results the copper or silver should be oxygen free.

In the manufacture of bearings particularly for service at high speeds and heavy loads such as are encountered in aircraft engines, it has been customary to form the backs, usually of steel, to the shape of a bearing and thereafter apply the bearing metal usually by casting or electroplating. Difficulty has been encountered in securing a uniformly good bond between the back and the bearing metal especially when heated over 1000° F. for desired softness and grain size so that a considerable percentage of the bearings manufactured by such methods are discarded because of poor bonding or other flaws in the back or liner not discovered until the machining has been practically completed. As a consequence all the work spent on the rejected bearing is lost.

By making bearings from clad sheet metal the percentage of defective bearings may be substantially reduced and the cost of manufacture substantially lowered. Sheet steel clad with copper or silver strongly bonded thereto, either with or without an intermediate bonding metal or alloy, is available on the market. The methods of manufacture of the clad metal involve thorough cleaning of the base metal followed by bonding or welding the bearing metal thereto usually in a non-oxidizing atmosphere to insure a good bond and prevent oxidation or embrittlement of the bearing metal by absorption of oxygen. Thereafter the composite material is usually rolled to the desired thickness, the rolling being accompanied by annealing at intervals and followed by a final anneal. Annealing should be done in a non-oxidizing atmosphere for the reasons pointed out. The method of manufacture constitutes a primary check on the character of the bond in that poor bonding is revealed in the rolling and annealing operations. Rolling also tends to improve the bond. The material is carefully inspected prior to manufacture into bearings and if the bonding is poor or otherwise defective the blank is rejected before any expense is incurred in machining it.

The preferred method of making the clad sheet metal into bearings consists in drawing it into cups of the desired size by means of successive draws and at the same time forming an end flange thereon if desired, and thereafter cutting off the closed end of the cup and machining the bearing to finished dimensions. The advantage of this procedure is that the working of the metal in forming constitutes another check on bonding, revealing any poor bonding or flaws or cracks in the metal of the back or lining so that the bearing may be rejected before machining. The working of the metal during drawing tends to refine the grain structure and somewhat harden it so that it will be found desirable to anneal the bearings between draws. Annealing also substantially softens the bearing metal and renders it more suitable for service.

Figure 1:
Figure 1 is a sectional view of a suitable blank of clad metal adapted to be made into bearings by my process.

The blank shown in Figure 1 preferably consists of steel indicated at 20 clad with bearing metal such as copper or silver indicated at 22. This clad metal may be made by any desired process. For example, sheet steel first thoroughly cleaned, may be united with a thin sheet of silver while hot, preferably under a non-oxidizing atmosphere, and thereafter the composite stock may be rolled to the desired thickness as previously described. This operation may also, if desired, be conducted under a protecting atmosphere.

In some cases it may be desirable to provide an intermediate bonding layer of another metal such as copper or silver solder between the steel and silver. The copper may be applied to the cleaned steel by electroplating or by fusing or bonding a thin layer of copper to the steel, the silver thereafter being applied to the copper after thorough cleaning, and united with it by means of heat and pressure.

The clad metal may, if desired, consist of steel with a coating of copper strongly bonded to it as, for example, by hydrogen brazing. However, if preferred, the copper may be united to the steel by means of an intermediate metal or alloy.

The copper or silver coating should be oxygen-free because of the superior frictional and other properties of the oxygen-free metal. Furthermore if the metal is not free of oxygen it becomes brittle when the bearing is given the preferred annealing treatment in a non-oxidizing atmosphere as hereinafter described.

Figure 2:
Figure 2 is a sectional view of a modified blank.

The invention is equally applicable to clad metal, such as shown in Figure 2, in which the steel is covered on both sides with bearing metal 24 shown as bonded thereto by an intermediate metal 26, the latter, of course, being optional.

Figure 3:
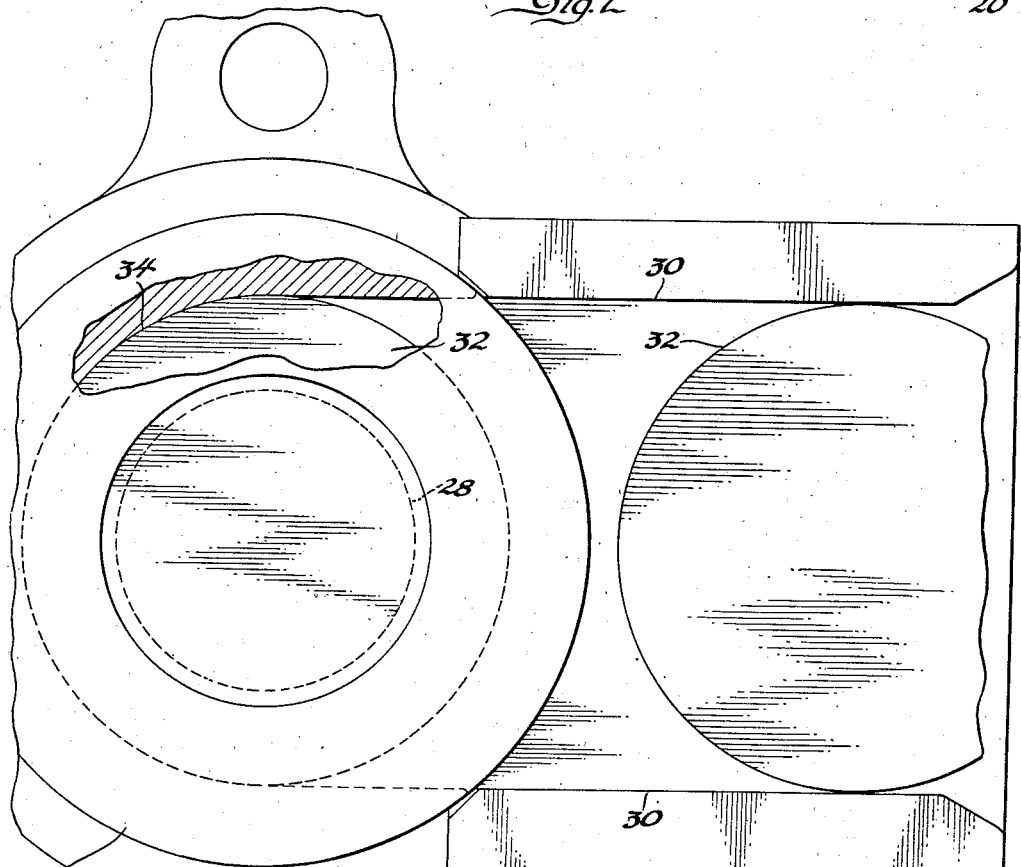
Figure 3 is a top plan view with parts broken away showing the arrangement for guiding the blank into the seat in the press, a blank being shown in operative position.
Figure 4:
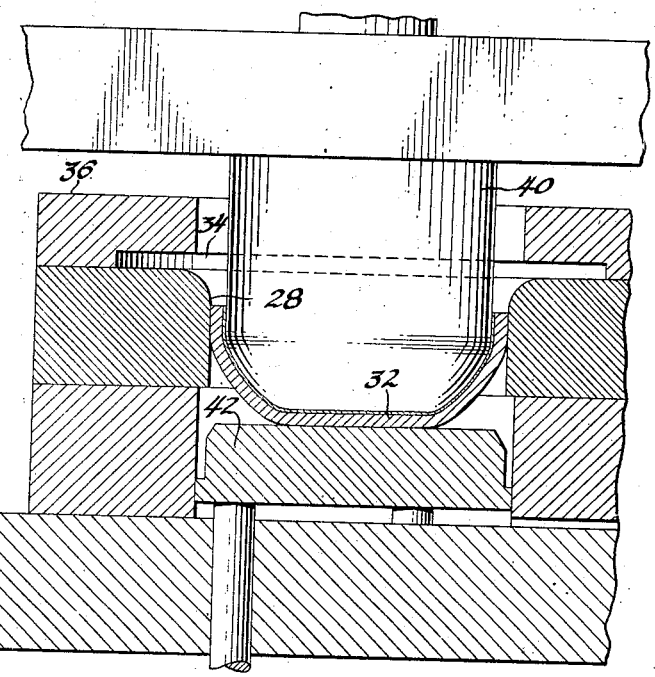
Figure 4 is a diagrammatic view with parts broken away showing the first drawing operation.
Figure 5:
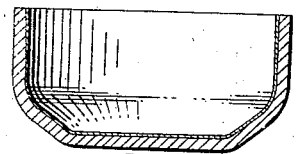
Figures 5, 6, 7, 8 and 9 show in section the shapes which the blank assumes at the end of successive draws.
Figure 6:
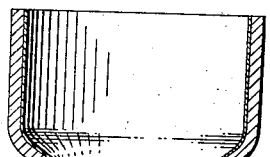
Figure 7:
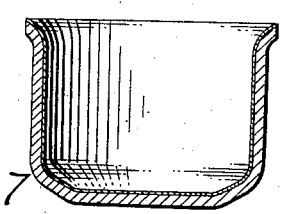
Figure 8:
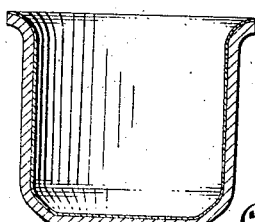
Figure 9:
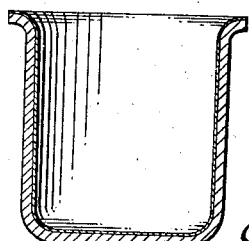

In the top plan view of the drawing die shown in Figure 3, 28 indicates the die aperture and 30 the guides between which the circular blank 32 is inserted so that it may be slid in place over the aperture 28. As best shown in Figure 4 the edges of the blank are normally received within an undercut 34 provided in the blank holder 36.

When the plunger 40 is advanced the blank 32 is drawn to the form indicated. The die is preferably of the bottomless type and an ejector 42 is provided to knock the formed blank out of the die.

Figure 10:
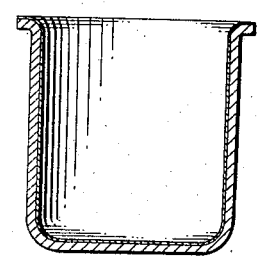
Figure 10 shows in section the shape the blank assumes after the final flange forming operation.
Figure 11:
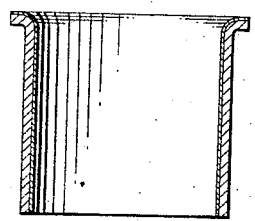
Figure 11 shows in section the blank as it appears after the bottom has been removed.

Figures 5, 6, 7, 8 and 9 show successive stages in drawing a blank while Figure 10 shows the shape the blank assumes after the final striking operation in which the blank is given its final set. Between draws as well as after the final draw the metal is annealed by heating it, preferably in a non-oxidizing atmosphere, to temperatures on the order of 1250°–1300° F. A non-oxidizing atmosphere is necessary to protect the copper or silver bearing metal. Both silver and copper are oxidized if heated for a considerable time in the air and both absorb oxygen when heated to annealing temperatures. In either case the bearing properties of the lining are seriously impaired. At the annealing temperatures oxygen penetrates the silver to a depth of from .010" to .015" so that annealing in the air may be practical provided the silver which has been impaired by oxygen absorption is removed in the subsequent machining of the bearing.

It has been found to be important to employ a greater number of draws than would be necessary in making the same shape out of plain sheet metal. Where too few draws are used there is a tendency to produce separation or cracking of the thin layer of bearing metal.

After about the third draw the edge of the cup should be trimmed to square it.

The operation producing the blank as shown in Figure 10 is followed by the final annealing referred to for the purpose of softening the metal and relieving working strains. Thereafter the bottom is removed from the cup by sawing, turning or the like, and the bearing is machined to final dimensions. The finished bearing is shown in Figure 12.

In some applications it is desirable to have a harder back than can be obtained by the process described. Hardening is accomplished by heat treatment which is preferably carried out after the rough machining has been done. In the case of a particular composition of steel the heat treatment consisted in heating the roughly machined silver lined bearings at 1600° F. in a protecting atmosphere, followed by quenching in oil or water and heating for an hour at 400° F.

Figure 12:
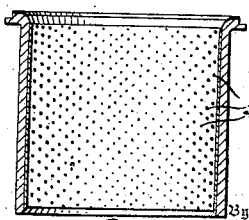
Figure 12 is a longitudinal section through the finished bearing.

Preferably the bearing surfaces are knurled to provide small depressions 50 as shown in Figure 12 filled with soft metal as described and claimed in the copending application of Alfred W. Schluchter, Serial No. 342,061, filed June 24, 1940. The alloy may consist of approximately 95% lead and 5% tin to protect the lead against corrosion. Another alloy suitable for filling the depressions in the grid consists of approximately 93% lead, 4% tin and 3% antimony. After application of this alloy, the bearing is heat-treated at approximately 450° F. in oil or air followed by a rapid quench. This has the effect of retaining the antimony in solution thereby increasing the hardness of the alloy and giving it greater fatigue life. If desired, the depressions may be only partially filled with soft bearing metal. Or the entire surface, both pits and spaces between the pits, may be plated with lead or with lead-tin alloy or other lead alloy resistant to corrosion.

In some instances it may be desirable to anneal the bearing after knurling to relieve work hardening but I have found it unnecessary in recent applications of the invention.

In some instances it will be found satisfactory to omit the lead altogether, the pits in such case acting as lubricant reservoirs.

The working to which the clad metal is subjected in its manufacture and in drawing the blank to bearing shape constitutes a very good check on both the metals involved and the bond between them. The stretching of the clad metal results in separation of the layers in case the bond is not strong. Cracks or flaws in the backing and covering metal are revealed in like manner. This is important in the case of bearings used in high powered internal combustion engines because disaster may result from their failure and it is important that every possible precaution be taken to make sure that there are no flaws.

This process is applicable not only to the manufacture of bearings from blanks such as shown in Figure 1 in which there is a layer of bearing metal on one surface only of the blank, but also to bearings in which the bearing material is applied to both surfaces as shown in Figure 2.

I claim:

1. The method of making bearings which consists in preparing a steel blank having thermally bonded thereto a layer of oxygen-free metal of the class consisting of copper and silver, forming a bearing shape therefrom by successive forming operations, annealing the shape in a non-oxidizing atmosphere between successive forming operations and after the final forming operation, rough machining the bearing, hardening the bearing back by heating the bearing to approximately 1600° F. in a protecting atmosphere followed by quenching and heating for approximately one hour at a temperature on the order of 400° F., and thereafter finish machining the bearing.

2. The method of making bearings which consists in bonding a layer of oxygen free metal of the class consisting of copper and silver to a flat steel blank, forming a bearing shape therefrom, annealing the shape in a non-oxidizing atmosphere, rough machining the bearing, hardening the bearing back by heat treatment of the bearing under a non-oxidizing atmosphere, followed by quenching, tempering the bearing by heat treatment under a non-oxidizing atmosphere, and thereafter finish machining the bearing.

3. The method of making bearings which consists in bonding a coating of ductile bearing metal to a steel blank, forming a bearing shape therefrom, annealing the shape, rough machining the bearing, hardening the bearing back by heat treatment of the bearing followed by quenching, tempering the bearing, and thereafter finish machining the bearing.

4. The method of making bearings which consists in preparing a steel blank having securely bonded thereto a layer of oxygen-free metal of the class consisting of oxygen-free copper and silver, forming a bearing shape therefrom by successive forming operations, annealing the shape in a non-oxidizing atmosphere between successive forming operations and after the final forming operation, rough machining the bearing, hardening the bearing back by heat treatment of the bearing under a non-oxidizing atmosphere followed by quenching, tempering the bearing by heat treatment under a non-oxidizing atmosphere, and thereafter finish machining the bearing.

5. The method of making bearings which comprises bonding a coating of ductile bearing metal to a substantially flat blank of strong base metal, drawing the blank into the form of a cup, cutting off the closed end of the cup and thereafter machining the bearing to finished dimensions.

6. The method of making bearings which consists in bonding a layer of ductile bearing metal to a blank of strong base metal, forming a bearing shape therefrom by successive drawing operations, annealing the shape between successive draws, annealing the shape after the drawing, and machining the shape to the dimensions of a finished bearing.

EUGENE B. ETCHELLS.